United States Patent [19]
Corfield et al.

[11] Patent Number: 5,289,169
[45] Date of Patent: Feb. 22, 1994

[54] COMPOSITE UNDERLINING FUNCTIONS FOR TEXT PROCESSORS

[75] Inventors: Charles N. Corfield, Palo Alto; Edward J. Kessler, Los Gatos; David J. Murray, Gilroy; Sandra A. Sundberg, San Jose, all of Calif.

[73] Assignee: Frame Technology Corporation, San Jose, Calif.

[21] Appl. No.: 648,291

[22] Filed: Jan. 31, 1991

[51] Int. Cl.$^5$ .............................................. G09G 1/06
[52] U.S. Cl. ...................... 340/144; 382/61; 395/144; 345/143
[58] Field of Search ................ 382/61; 395/144, 145, 395/146, 147, 148, 149, 150, 151, 143; 340/730, 735, 748, 750

[56] References Cited
U.S. PATENT DOCUMENTS
| | | | |
|---|---|---|---|
| 4,737,922 | 4/1988 | Ogasawara et al. | 395/144 |
| 4,849,747 | 7/1989 | Ogawa et al. | 340/730 |
| 5,012,232 | 4/1991 | Fadem | 340/748 |

*Primary Examiner*—Leo H. Boudreau
*Attorney, Agent, or Firm*—Fliesler, Dubb, Meyer & Lovejoy

[57] ABSTRACT

Disclosed are text processing methods and text processing apparatus in an imaging system which images text characters and associated text functions, and specifically images text underline functions. The imaging system operates to control the appearance of rules for underlining functions, by controlling the offset (O), thickness (T) and gap (G) parameters as a function of user input values and as a function of font size (F_size) and typeface parameters (Para_1 and Para_2). A plurality of underline algorithms including a homogeneous algorithm and a composite algorithm are provided for controlling rules.

23 Claims, 3 Drawing Sheets

FIG. 4

Courier Bold 20 point
Helvetica 20 point
Courier Bold 10 point
Helvetica 10 Point

FIG. 5

Courier 20pt CourierBold

FIG. 6

Courier 20pt CourierBold

FIG. 7

|     | Q1    | Q2    | Q3    | Q4    | Y       |
|-----|-------|-------|-------|-------|---------|
|     | $123  | $123  | $123  | $123  | $123 |
|     | $123  | $123  | $123  | $123  | $123 |
|     | $123  | $123  | $123  | $123  | $123 |
|     | $123  | $123  | $123  | $123  | $123 |

FIG. 8

FAXasdf

TAXnjkb        TAXnjkb

COMPOSITE UNDERLINING FUNCTIONS FOR TEXT PROCESSORS

BACKGROUND OF THE INVENTION

This invention relates to text processing methods and text processor apparatus forming an imaging system for generating, storing, displaying, drawing, printing and otherwise imaging text.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Text processors are well-known in the field of computers and data processors for imaging characters in fonts of different typefaces and sizes. Text processors typically define text characters with a generic definition in a character table, for example, an ASCII table, which is independent of typeface or size. The term "typeface" refers to the general appearance and design of characters and the term "font" refers to a complete set of characters having the same typeface, that is, the same general appearance and design.

Many text processors employ font metric tables specifying different font parameters so that together with the character tables the text processor generates characters with different typefaces and sizes. The font metric tables provide metric information which establishes the relative metric relationship among different characters in a font but generally such information does not establish the absolute measurements of the characters. The absolute measurements are established as the product of the font size and the metric information. One example of a font table is the Adobe Font Metrics font table (AFM file) which provides among other parameters an Underline Position and an Underline Thickness (in fractions of an em). The term "font properties" refers to any or all of the properties associated with a font such as font size, underline position of rules and thickness of rules.

Computers and data processors that use text processors are imaging systems that output the processed text in human readable form. The imaging systems typically include computer display screens for electronic output or printers for paper output. In such imaging systems, each character is drawn by a number of pixels (points) that are located and addressed by an X-axis coordinate and a Y-axis coordinate defined relative to an XY-axes system where an X-axis and an orthogonal Y-axis form a matrix of addressable pixels. Each pixel is drawn by determining the X-axis and Y-axis coordinates for the pixel and each character is drawn by determining the X-axis and Y-axis coordinates for all the pixels that are used to draw the character. The XY-axes system can have any arbitrary rotation. Typically, for printers, the X-axis is across the page so that the Y-axis is down the page as read by a human viewer.

For text processors, characters are typically defined along the X-axis by a character line where many character lines for text define a page of text. Each character typically is formed with pixels from many pixel lines so that depending upon the font parameters, characters can have different shapes and sizes depending upon the pixels selected for a character both in the X-axis and Y-axis directions. For convenience, some X-axis pixel line near the bottom of a line of characters is defined as the baseline of a character line. Text processors operate to define characters along character lines and use font parameters to actually determine the pixels to be drawn for each character appearing in the character line.

Many known text processors support the function of underlining text which is a function that enables a user to choose to have text characters underlined with a "rule". A "rule" is defined to be a line of some thickness beneath the characters and parallel to the baseline of the characters. When a single rule is located beneath the line of characters, the function is single underlining. When first and second parallel, spaced-apart rules are located beneath a line of characters, the function is double underlining. When more than one (two, three or more) parallel, first and second spaced apart rules are located beneath a line of characters, the function is multiple underlining. Text processors which have single and/or double : underlining functions are known.

The term "user" refers both to human operators of an imaging system and to application programs or other parts of the imaging system which operate the system. Also, while output images produced from an imaging system may have appearances perceived by humans, the output images may be sensed by optical character readers or other electronic equipment without any human involvement.

For the underlining functions of text processors, the rules (parallel lines offset from the character line) are described in terms of offsets of the rules below the baseline and the thicknesses of the rules. In the case of the single underlining function, the offset of the single rule below the baseline and the thickness of the rule are specified. In the case of the double underlining function, the offset of the first rule below the baseline, the thicknesses of the first and second rules, and the gap between the first and second rules are specified.

The offset, thickness, and gap parameters for rules in text processors are typically functions of the typeface and size. However, for a given typeface and size, the most aesthetically pleasing values for the rule parameters depend upon other characteristics surrounding the underlined text.

Homogeneous underlining is the common method of underlining for many text processors. For homogeneous underlining, the parameters of offset, thickness, and gap for rules are functions of the font size and also are functions of the typeface. Typically, for a given size, a bolder typeface has a bolder (thicker) underline. In many text processors, only homogeneous underlining is provided and users have no choices.

Heterogeneous underlining is another method of underlining for text processors. For heterogeneous underlining, where different typefaces are in close proximity, the parameters of offset, thickness, and gap for rules are functions of font size without any dependency on typeface. Again, users have no ability to control the appearance of the underlining style.

Constant underlining is another method of underlining for text processors. Constant underlining is particularly suited, for example, to financial tables where users often wish to have the underlining to be independent of both the font size and typeface.

The printing industry, and other fields distinguished from the field of text processors, for many years have created a broad range of rules for underlining text. Such non-text processing technologies permit rules (lines offset from text) to be located, independently of the text, at any arbitrary location relative to the text. Of course, when rules can be arbitrarily placed, they provide the same appearance as rules generated by the underlining functions of text processors. However, arbitrary rule placement, independent of text placement, is not practical for text processors. Text processors with underline functions draw the underline rules as a function of imaging the text thereby greatly simplifying the imaging of rules with text.

While known text processors have provided single algorithms for rule generation and hence have greatly simplified the placement of rules using underlining functions, those text processors have also greatly limited the choices available to users and consequently the appearance of rules (lines offset from other text) in text processor documents is often not satisfactory.

In accordance with the above background, there is a need for improved text processors which allow users to select different underlining functions to achieve different styles of underlining and thereby generate displays and documents that have an improved appearance without sacrificing functional simplicity.

SUMMARY OF THE INVENTION

The present invention comprises text processing methods and text processing apparatus in an imaging system which images text characters and associated text functions, and specifically, images text underline functions.

The imaging system operates to control the appearance of rules for underlining functions, by controlling the offset (O), thickness (T) and gap (G) parameters as a function of user input values and as a function of font size (F_size) and typeface parameters (Para_1 and Para_2). A plurality of underline algorithms including a homogeneous algorithm and a composite algorithm are provided for controlling rules.

The homogeneous single underline algorithm uses offset and thickness parameters determined from font size and typestyle metric values (typically, Para_1=Underline Position and Para_2=Underline Thickness) from a font metric table. In the homogeneous underline algorithm, the typestyle dependency is as follows:

offset (O)=F_size * Underline Position
thickness (T)=F_size * Underline Thickness The composite underline algorithms have offset (0), thickness (T), and gap (G) rule parameters determined in response to user input values X, Y, Z; X',Y',Z'; X", Y", Z" and a composite array of font size (F_size) and typestyle parameters (Para_1, and Para_2) as follows:

O=X(F_size)+Y(F_size, Para_1)+Z
T=X'(F_size)+Y'(F_size, Par_2)+Z'
G=X"(F_size)+Y"(F_size, Para_1)+Z".

In one preferred embodiment, the functional relationships are multiplies ("*" is a multiply operator) and the user selects nine multipliers X, Y, Z; X',Y',Z'; and X", Y", Z" to define offset(O), thickness(T), and gap(G) in a composite multiplication array where Para_1=Underline Position and Para_2=Underline Thickness (as obtained from a font metric table) as follows:

O=X * F_size Y * F_size * Underline Position+Z
T=X'* F_size+Y'* F_size * Underline Thickness+Z'
G=X"* F_size Y"* F_size * Underline Thickness+Z"

In one embodiment, the two underline rules for double underline functions have the same thickness and in another embodiment each underline rule has independently controllable thickness. In the composite formulae given above, the nine multipliers can be set to 0, 1 and other integer or fractional values which enable user selection of multiple underline algorithms.

In accordance with the above summary, an improved text processor is provided which allows users to select different underlining functions to achieve different styles of underlining and thereby generate displays and documents that have an improved appearance.

Other objects, features, and advantages of the present invention will become more apparent in the light of the following detailed description thereof, as illustrated in the drawings.

BRIEF DESCRIPTION OF THE DRAWINGS

FIG. 4 depicts a representation of the single underline homogeneous underline algorithm executed by the FIG. 1 system using Helvetica and CourierBold from Adobe for single underline rules.

FIG. 5 depicts a representation of the homogeneous underline algorithm executed by the FIG. 1 system for a Run of Courier followed by a Run of CourierBold from Adobe where data from the afm files is used to calculate offset and thickness for rules in a Run.

FIG. 6 depicts a representation of the composite underline algorithm executed by the FIG. 1 system for a Run of Courier followed by a Run of CourierBold from Adobe where font size is used to calculate offset and thickness Without dependency on typeface.

FIG. 7 depicts a representation of the composite underline algorithm executed by the FIG. 1 system using Runs of Times in two font sizes (10 and 12pt) and two typefaces (Roman and Bold).

FIG. 8 depicts representations of double underline rules.

DESCRIPTION OF THE PREFERRED EMBODIMENTS

Figure 1:
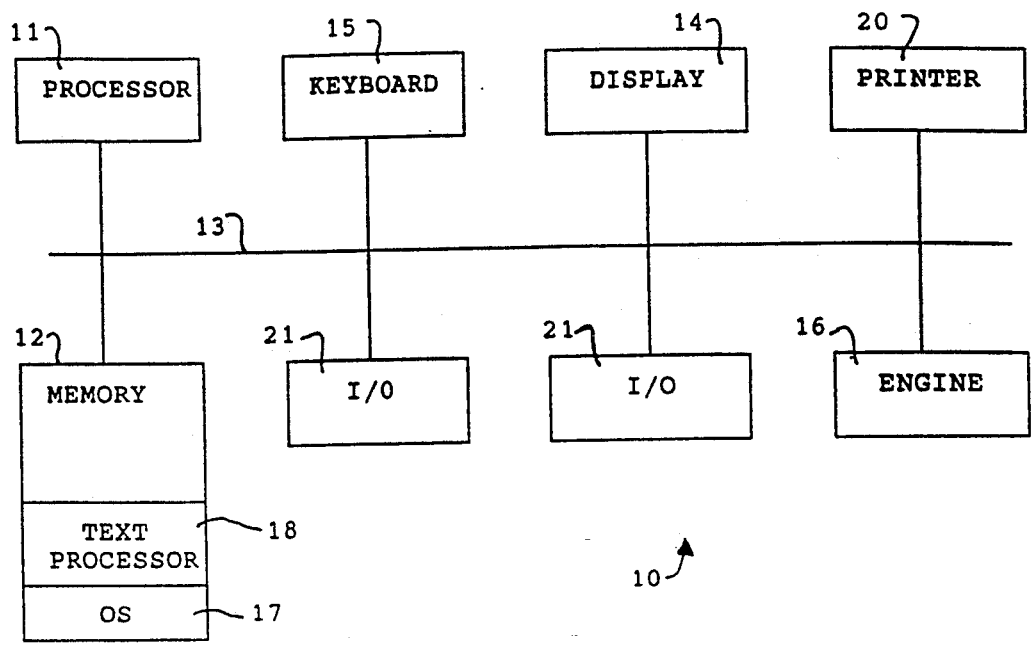
FIG. 1 depicts a block diagram representation of an imaging system having a text processor in accordance with the present invention.

Overall System—FIG. 1

FIG. 1 depicts a block diagram representation of an imaging system 10 in accordance with the present invention. Typically, the system 10 is a conventional computer system having a processor (CPU) 11, a memory 12, a keyboard 15, a display 14, and a printer 20 and I/O devices 21. The display 14 and printer 20 provide images in human readable form. The I/O devices 21 can include plotters or other devices which output images of text in human-readable form.

In the FIG. 1 system, application computer programs 18 are stored in the memory 12 and are executed in the processor under control of a software operating system 17 also stored in memory 12. The general operation of such computer systems is well known.

Application programs 18 executable by the system 10 have a need to draw lines of text which are characters. When characters are drawn by a text processor program, an imaging system in accordance with the present invention is formed. The text processor program is one example of the application program 18.

A text processor application program performs a text processor method in the apparatus of FIG. 1 to generate and store lines of characters in the memory 12. From the memory 12, the stored lines are displayed by display 14 or printed by printer 20. The system of FIG. 1 operates by addressing pixels in an XY-axes coordinate system where, each pixel (point) is located and addressed by an X-axis coordinate and a Y-axis coordinate defined relative to orthogonal X and Y axes which form a matrix of addressable pixels. A pixel is drawn by determining the X-axis and Y-axis coordinates for the pixel and a line of characters is drawn by determining the X-axis and Y-axis coordinates for all the pixels on the line that are used to define the characters.

A preferred embodiment of the invention employs a computer program, as provided hereinafter as TABLE for example, executing in a general purpose computer of FIG. 1. While a preferred embodiment of the invention employs a computer program, a special purpose text processor (engine) 16, as shown in FIG. 1, is also within the scope of the present invention. For example, when the text processor engine 16 is employed in the FIG. 1 system, the processor 11 is not required to execute the text processor program of TABLE 1 since the methods of TABLE 1 are performed by the special purpose engine 16.

Figure 2:
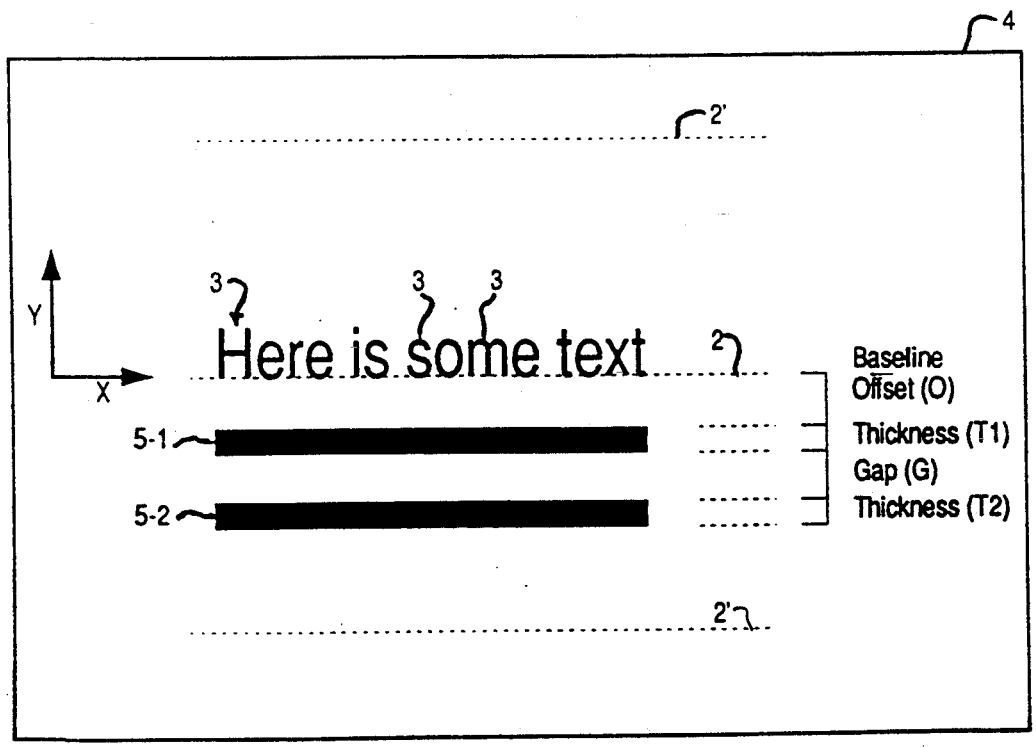
FIG. 2 depicts an XY-axes coordinate system for drawing lines of characters for pages including sample text depicting the underline parameters for rules.

Coordinate System—FIG. 2

In FIG. 2, an XY-axes coordinate system for drawing lines of text-processor characters 3 is shown. For convenience, the X-axis is aligned horizontally across the short length of a page 4 and the Y-axis is aligned vertically along the long length of the page 4. The XY-axes coordinate system of FIG. 2 is typical of the coordinate system used for output images from text processors employed in imaging systems of the FIG. 1 type.

For text processors, characters are drawn along a character line 2 parallel to the X-axis where the character line 2 and other character lines 2' define a page 4. For an eleven inch page (in the Y-axis direction) with six character lines per inch, a total of 66 character lines 2 and 2' may be drawn on the page. Each character line 2 is one of many X-axis pixel lines associated with a line of characters so that depending upon the font parameters, each character can have different pixel shapes and sizes both in the X-axis and Y-axis directions. For convenience, some X-axis pixel line 2 near the bottom of a line of characters 3 is defined as the baseline and this baseline 2 is the reference for other character lines 2' on the page and for pixel lines associated with that character line 2.

The output images from the FIG. 1 imaging systems are processed text in human readable form. In FIG. 2, as an example, one line of text characters "Here is some text" is drawn along the character line 2 parallel to the X-axis.

Each character associated with character line 2 in the output image is drawn by a number of pixels (points) where each pixel is located and addressed by an X-axis pixel row coordinate and a Y-axis pixel column coordinate defined relative to the XY-axes system.

Each pixel is drawn by determining the X-axis pixel row and Y-axis pixel column coordinates for the pixel and each character is drawn by determining the X-axis and Y-axis coordinates for all the pixels that are used to draw the character. In FIG. 2, for example, the character "H" in the word "Here" is drawn with many pixels that occur in horizontal pixel rows and vertical pixel columns. If the resolution of the output image for page 4 is 300 pixels per inch, then to draw the letter "H" of FIG. 2 requires approximately 50 pixel rows and 40 pixel columns.

The text processor in FIG. 1 supports the function of underlining text which is a function that enables a user to choose to have text characters, such as characters 3, underlined with one or more "rules" 5 including a first rule 5-1 and a second rule 5-2. A "rule" is defined to be a line of some thickness, T, with an offset, O, beneath the characters 3 and parallel to the baseline 2 of the characters. When a single rule 5-1 is located beneath the line of characters 3 in FIG. 2, the text processor of FIG. 1 includes the function of single underlining. When double rules 5-1 and 5-2 are located beneath the line of characters 3 in FIG. 2, the text processor of FIG. 1 includes the function of double underlining.

For the underlining functions of the text processors of FIG. 1, the rules 5-1 and 5-2 are described in terms of offsets, O, of the rules below the baseline 2 and the thicknesses T of the rules 5. In the case of the single underlining function, the offset, O, of the single rule 5-1 below the baseline 2 and the thickness, T, of the rule 5-1 are specified. In the case of the double underlining function, the offset, O, of the first rule 5-1 below the baseline, the thicknesses T1 and T2 of the first and second rules 5-1 and 5-2, and the gap, G, between the first and second rules 5-1 and 5-2 are specified. In the embodiment described, $T1=T2$, and hence only a single thickness parameter T ($T1=T2=T$) is required.

In the FIG. 1 system, the offset, thickness, and gap parameters for rules are not limited to being functions of the typeface and size since other characteristics surrounding the underlined text are utilized to enable a user to select the most aesthetically pleasing values for the rule parameters in accordance with the methods of the present invention.

Figure 3:
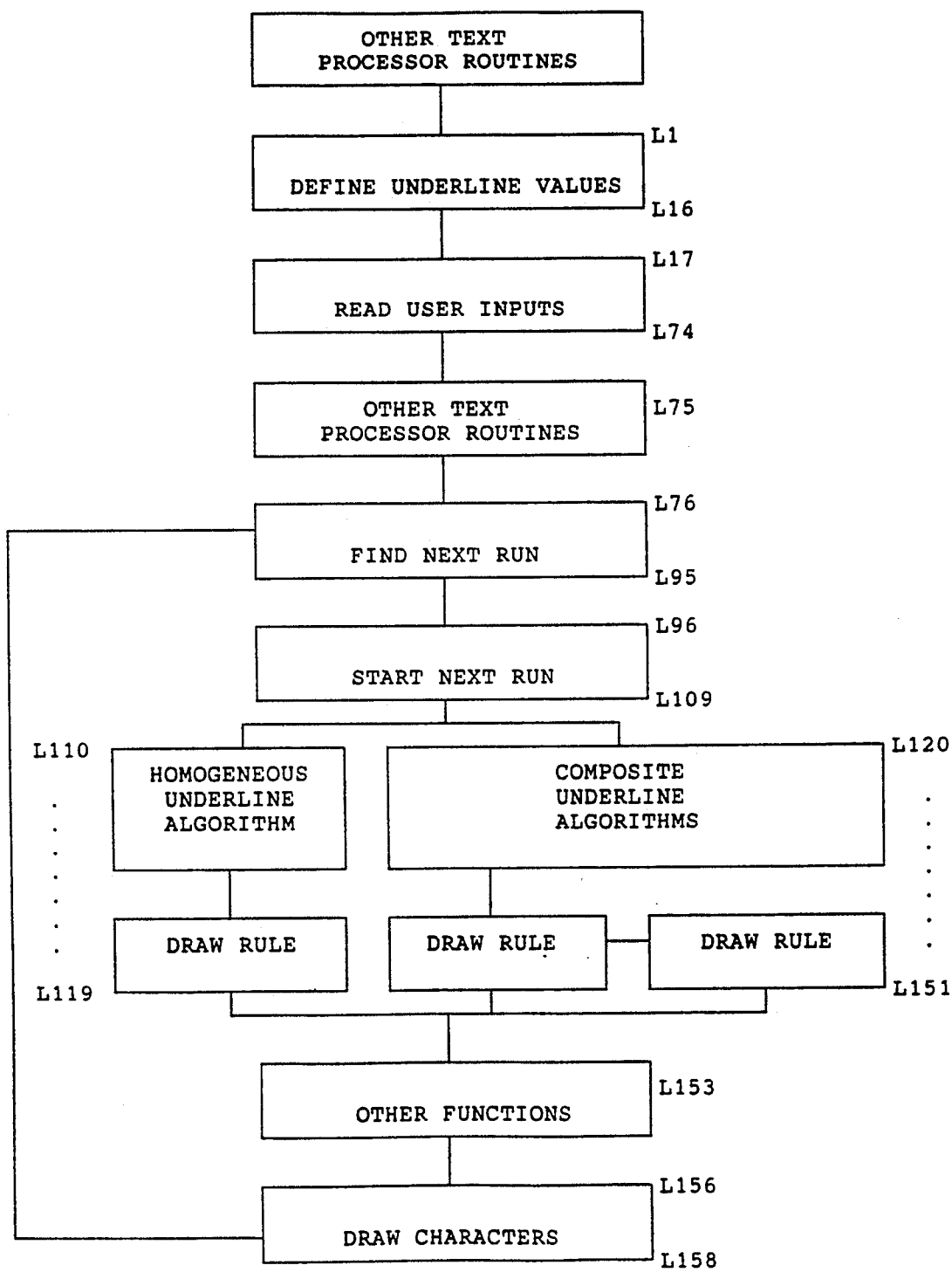
FIG. 3 depicts a block diagram of the underline methods performed by the FIG. 1 system.

Underline Methods—FIG. 3

FIG. 3 depicts a block diagram flow chart depicting the operation of the FIG. 1 imaging system when a text processor performs methods of imaging rules under characters. To image rules, typically the imaging system of FIG. 1 executes a computer program of the type listed hereinafter in TABLE 1. The computer program of TABLE 1 is, in part, in C language format and is compiled in a conventional manner to form a run-time program suitable for execution in the FIG. 1 system.

In the flow diagram of FIG. 3, the routines OTHER TEXT PROCESSOR ROUTINES represent the conventional routines of well-known text processors. In general, such text processors process text a character line at a time and a character at a time in each character line. As part of such conventional processing, the text processor images each character in each character line as a function of font size and metric data from a font table in order to draw the pixels that form the human-readable output image with a particular size and typeface.

As part of the text processor execution, the imaging system of FIG. 1 executes the imaging steps of FIG. 3 in order to efficiently execute underline and other functions associated with text.

In FIG. 3, the steps for underline and other functions start with the DEFINE UNDERLINE VALUES routines which define the composite algorithmic structure for underline functions using X, Y, and Z values.

In FIG. 3, the READ USER INPUTS routines permit the user to select from nine input values X, Y, Z; X',Y',Z'; X", Y", Z" which define offset(O), thickness(T), and gap(G) in a composite array (where "*" is a multiply operator) as follows:

O = X * size + Y * size * Underline Thickness + Z
T = X'* size + Y'* size * Underline Thickness + Z'
G = X"* size + Y"* size * Underline Position + Z"

In the READ USER INPUTS routines, the nine input values are initialized to default values and thereafter set to user selected input values specified by "preferences" which are input with a data format in which each value is separated by a left bracket. The "loop" searches for left brackets with the UiGetLeftBracket routine to thereby locate each of the input values.

In FIG. 3, the OTHER TEXT PROCESSOR ROUTINES performs other processes.

In FIG. 3, the FIND NEXT RUN routines search through a character line of text for a "Run" of characters to find the Next Run (that is, a string of characters in a line having the same imaging characteristics).

In FIG. 3, the START NEXT RUN routines start the processing of a line of text a Run at a time. For each line and for each Run in a line, the flushrun ( ) routine selects and executes an underline algorithm selected by a user and corresponding to that Run.

In FIG. 3 in the HOMOGENEOUS UNDERLINE ALGORITHM routines, the parameters of offset(O), thickness(T), and gap(G) for rules are functions of the font size and also are functions of the typeface without user control. These HOMOGENEOUS UNDERLINE ALGORITHM routines permit the imaging system of FIG. 1 to operate identically with the standard method familiar to many users of text processors.

In FIG. 3 in the COMPOSITE UNDERLINE ALGORITHMS routines, the parameters of offset(O), thickness(T), and gap(G) for rules are functions of the user inputs in a composite array under user control. These COMPOSITE UNDERLINE ALGORITHMS routines permit the imaging system of FIG. 1 to operate under user control to create many underline functions not heretofore available to users of text processors.

In FIG. 3, the DRAW RULE routines execute the do_hvector( ) routines of TABLE 1 to draw the Rules as in accordance with the particular underline algorithm selected as a function of the user inputs.

After the Rules have been drawn, the OTHER FUNCTIONS routines of FIG. 3 execute other functions, if any, associated With the Rule being processed for a line of text.

After the OTHER FUNCTIONS routines have been executed in FIG. 3, the DRAW CHARACTERS routines are executed to draw the characters of the Run with which the already drawn Rules are associated.

Computer Program—TABLE 1

The computer program of TABLE executes generally in accordance with the flow chart of FIG. 3. More specifically, the routines in TABLE 1 are characterized as follows.

InitSession ( ): This routine reads the user "preferences" for the (x,y,z) values to define the "offset"(O), "gap"(G), and "thickness"(T) using the formulae array for the Composite Underline Algorithms.

The user places values in a file "preferences" and the InitSession ( ) routine, after initialization with default values, reads and stores those user input values, in a structure called "NumUnderline", which is used by the imaging code of TABLE 1 to draw Rules using one of a plurality of algorithms for underline functions.

The file format of "preferences" is:

<NumUnderlineOffset x y z>
<NumUnderlineThickness x y z>
<DblUnderlineGap x y z> where x and y are decimal fractions (for example, "0.7"), and z is a dimensioned value (e.g., "1pt");

IOSSoanX( ): This routine scans strings which contain numbers and units and converts them into internal measurements.

typedef PathT: This defines a character array large enough to hold strings.

flushrun ( ): This routine images a Run of text. A Run of text is that contiguous part of a line of text in which the characters have the same properties for a function such as an underline function. The routine flushrun( ) is called by a routine, ImageTextLine( ), which is a routine for drawing a line of text divided into Runs. flushrun( ) images the text in the Run and images Rules (or other function generated images) associated with the text. In the embodiment of TABLE 1, flushrun( ) calculates the "offset(O)", "thickness(T)", and "gap(G)"values used for the underlining function and then calls a routine do_hvector( ) to draw a rule (a line below the text with appropriate position, extent and thickness) for the underlining function.

The text characters in the Run are drawn by the routine textstr( ). Prior to execution of the routine textstr( ), all of the font requirements are set up by OTHER TEXT PROCESSOR ROUTINES in a conventional manner so that textstr( ) is executed using a list of the text characters to be drawn as the argument.

Values which are explicitly or implicitly used in the TABLE 1 program are as follows.

(A) The routine ImageTextLine( ) calling the routine flushrun( ) calculates the beginning and end positions of the Run of text. These beginning and end positions are used implicitly by the do_hvector( ) routine to execute the draws.

(B) The "offset(O)", "thickness(T)" and "gap(G)" values for underlining are represented by:
numUnderlineY,
numUnderlineTh,
dblUnderlineGap (C) The variable "fmp" points to the metrics in the metric table for the specified font. The offset(O) distance beneath the baseline and thickness(T) for homogeneous (regular) underlining functions are contained in "fmp->pul_y", "fmp->pul_t".

(D) The type of underlining is contained in the flag "netstyle", which is set up by the routine calling flushrun( ).

(E) The routine MetricMul( ) multiplies two numbers together. In the embodiment of TABLE 1, all fractional quantities are represented by 32-bit fixed-point numbers (metricT's).

TABLE 1
Copyright 1991 Frame Technology Corporation

```c
/* Define Values for the "NumUnderline" structure */ typdedef struct {
    MetricT x;       /* Multiple of the point size */
    MetricT y;       /* Multiple of the AFM value  */
    MetricT z;       /* Constant value             */
} NumULParmsT;

typedef struct {
    NumUParmsT offset;   /* Distance from baseline to top of Rule */
    NumULParmsT thick;   /* Thickness of Rule */
    NumULParmsT gap;     /* Distance between bottom edge of upper
                            Rule and top edge of lower Rule in double
                            underline */
} NumUnderlineT;

extern NumUnderlineT NumUnderline;

/* Read User Inputs */
InitSession()
{
    PathT    str;
    RealT    f1, f2;
    StreamT  stream;
    UCharT   c;

/* Initialize Default Values */

NumUnderline.offset.x = 0;
    NumUnderline.offset.y = 0;
    NumUnderline.offset.z = 2 * FM_POINT;
```

```
    NumUnderline.thick.x = 0;

NumUnderline.thick.y = 0;

NumUnderline.thick.z = 0.5 * FM_POINT;

NumUnderline.gap.x = 0;

NumUnderline.gap.y = 0;

NumUnderline.gap.z = 1.5 * FM_POINT;

/* Read User Input "preferences" */
if (!(stream = fmopen ((StringT)"preferences", (StringT)"r")))
    return(Failure);
loop
    {
    /* Search for opening "<" */
     UiGetLeftBracket (c, stream);
     if (IsEOF(c))
         break;
    /* Read token */
     fscanf (stream, (StringT)"%s:, str);

if (StrEqual (str, (StringT)"NumUnderlineOffset"))

{
     fscanf (stream, (StringT)"%f%f%s", &f1, &f2, str);
     NumUnderline.offset.x = MetricFloat(f1);
     NumUnderline.offset.y = MetricFloat(f2);
     IOSScanX (str, FM_POINT, &NumUnderline.offset.z);
    }
    else if (StrEqual (str, (StringT)"NumUnderlineThickness"))
        {
        fscanf (stream, (StringT)"%f%f%s, &f1, &f2, str);
        NumUnderline.thick.x = MetricFloat(f1);
        NumUnderline.thick.y = MetricFloat(f2);
```

```
                IOSScanX (str, FM_POINT, &NumUnderline.thick.z);
            }
        else if (StrEqual (str, (StringT)"DblUnderlineGap"))
            {
                fscanf (stream, (StringT)"%f%f%s", &f1, &f2 str);
                NumUnderline.gap.x = MetricFloat(f1);
                NumUnderline.gap.y = MetricFloat(f2);
                IOSScanX (str, FM_POINT, &NumUnderline.gap.z);
            }
        }
    fclose (stream);
    return (Success);
}
/* Other Text Processor Routines */

/* Find Next Run in a character line*/
StringT Line;
StringT Start;
StringT End;
FindNextRun()
{
    StringT p;

if(!Line)
        return(NULL);
    p = Line;
    Start = p;
    while (SameCharacteristics(p))
        NextChar (&p);      /* Advance the p pointer one character
                                in the StringT */
    End = p;
    NextChar(&p);
    Line = p;
```

```
        return (Start);
}
/* Start Next Run (image characters and functions of Run) */
ImageTextLine (line)
    StringT line;
{
    Line = line;

while (FindNextRun()) {
        flushrun();
    }
} flushrun()
{
    MetricT numUnderlineY, numUnderlineTh, dblUnderlineGap;

/* Homogeneous (Regular) Underline Algorithm */
    if (netstyle & FM_CB_UNDERLINE)
      {
        MetricT uly;
        /* Use fontmetrics to determine the offset and thickness */
        uly = yo + fmp->pul_y - fmp->pul_t/2;

/* Draw Rule in the Run */
        do_hvector(uly, fmp->pul_t);
      }
    /* Composite Underline Algorithms */
     if (netstyle & (FM_CB_NUMUNDERLINE | FM_DB_DBLUNDERLINE))
         {
           /* Use the user specified multipliers, font size, and metrics
            * to determine the offset and thickness of the single first
            * underline.
```

```
    */ numUnderlineY = MetricMul (NumUnderline.offset.x, cbp->size)

+ MetricMul (NumUnderline.offset.y, fmp->pul_y)

+ NumUnderline.offset.z;

numUnderlineTh = MetricMul (NumUnderline.thick.x, cbp->size)

+ MetricMul (NumUnderline.thick.y, fmp->pul_t)

+ NumUnderline.thick.z;

/* Draw Rule in the Run */ do_hvector(yo + numUnderlineY, numUnderlineTh);

} if (netstyle & FM_CB_DBLUNDERLINE)

{

/* Use the user specified multipliers, font size, and metrics

* to determine the gap between the rulings for double

* underlining.

*/ dblUnderlineGap = MetricMul (NumUnderline.gap.x, dbp->size)

+ MectricMul (NumUnderline.gap.y, fmp_.pul_t)

+ NumUnderline.gap.z;

/* Draw Rule in the Run */ do_hvector (yo + numUnderlineY + numUnderlineTh +
dblUnderlineGap, numUnderlineTh);

}

/* ... Other Functions in the Run, Optional .../

/* Draw Characters in the Run */
 textstr();
}
```

Single Underline Using Homogeneous Algorithm—FIG. 4

FIG. 4 depicts a representation of the single underline function using the homogeneous algorithm executed by the FIG. 1 system using single Runs of different sized of Helvetica and CourierBold from Adobe where each Run is on a different character line. The FIG. 4 imaging is performed based upon user inputs which select the HOMOGENEOUS UNDERLINE ALGORITHM, lines 111 through 119 of Table 1.

Single Underline Homogeneous Method—FIG. 5

FIG. 5 depicts a representation of the single underline function using the homogeneous algorithm executed by the FIG. 1 system using two Runs, the first Run draws the 20pt Courier and the second Run draws the CourierBold (both the Adobe) where data from the afm files is used to calculate offset and thickness for the Rules. In that homogeneous underlining algorithm, the parameters of offset, thickness, and gap for rules are functions of the font size and also are functions of the typeface. Typically, for a given size, a bolder typeface has a bolder underline. The text processor of FIG. 1 is able to execute the function of homogeneous underlining as one of the choices available to the user. Note in FIG. 5, however, a change in the thickness (Note jaggy) of the rule 5-1 which occurs in the rule between the Courier and CourierBold typefaces. Many users find the jaggy in the rule disturbing. The FIG. 5 imaging is performed based upon user inputs which select the HOMOGENEOUS UNDERLINE ALGORITHM, lines 111 through 119 of TABLE 1.

Single Underline Composite Method—FIG. 6

FIG. 6 depicts a representation of the single underline function using the composite algorithm executed by the FIG. 1 system using two Runs, the first Run draws the 20pt Courier and the second Run draws the CourierBold (both the Adobe) where user input data is used to calculate offset and thickness for he Rules. Note that in FIG. 6, no jaggy appears even though a change in typeface from Courier to CourierBold occurs. The font size is used to calculate offset and thickness without, however, any dependency on typeface. The FIG. 6 imaging is performed based upon user inputs which select the COMPOSITE UNDERLINE ALGORITHMS, lines 121 through 151 of TABLE 1.

Composite Method—FIG. 7

FIG. 7 depicts a representation of the composite underline method executed by the FIG. 1 system using Times in two font sizes (10 and 12pt) and two typefaces (Roman and Bold). In FIG. 7, although two font sizes (10 and 12pt) and two typefaces are used, neither the single rule nor the double rule varies. The FIG. 7 imaging is performed based upon user inputs which select the COMPOSITE UNDERLINE ALGORITHMS, lines 121 through 151 of TABLE 1.

Double Underline Methods—FIG. 8

FIG. 8 depicts a line of text FAXasdf with two runs, one (FAX) with a single underline rule and one (asdf) with double underline rules. As part of conventional processing, note that the single underline rule is not contiguous with either of the double underline rules. Such a non-contiguous image results from the operation of conventional text processors and users find such non-contiguous images undesirable. In the present invention, the single underline is made to automatically be contiguous with either of the double underlines as shown in the TAXnjkb examples by choosing the appropriate user input valves.

Further and Other Embodiments

While the invention has been described with respect to single and double underline functions for imaging first and/or second rules offset under corresponding text, the invention of course applies to two, three or any number of rules imaged with respect to corresponding text so as to provide a general multi-rule underline function.

While the invention has been described with respect to underline functions for imaging rules offset under corresponding text, the invention of course applies to rules that are offset over corresponding text.

While the invention has been described with respect to underline functions for imaging rules offset from corresponding text, the invention of course applies to rule-like images that are drawn under, over, through, beside or otherwise located with respect to corresponding text.

The preferred embodiment of the present invention uses a composite functional array having nine user input values together with font size and typestyle parameters. Of course, arrays of additional and/or other parameters may be employed to form alternate embodiments of underline algorithms that are user controlled in accordance with the present invention.

While the invention has been particularly shown and described with reference to preferred embodiments thereof, it will be understood by those skilled in the art that the foregoing and other changes in form and details may be made therein without departing from the spirit and scope of the invention.

We claim:

1. In an imaging system including a text processor having underlining functions, the method of imaging rules for characters of one or more fonts comprising:
    reading user inputs for specifying underline algorithms and defining the characteristics of the rules for a particular one or more of the underlining functions,
    selecting an underline algorithm from a plurality of underline algorithms as a function of the user inputs,
    configuring the manner in which the selected algorithm depends on font properties as a function of the user inputs and for said particular one or more of the underlining functions, modifying the characteristics of the rules as a function of the user inputs,
    drawing the rules in accordance with the underline algorithm.

2. The method of claim 1 wherein one of said underline algorithms is a homogeneous underline algorithm for drawing rules as a function of typeface and font size.

3. The method of claim 2 wherein said homogeneous underline algorithm controls the rules to be drawn as a function of typeface parameters from a metric table.

4. The method of claim 1 wherein one of said underline algorithms is a composite algorithm for drawing rules based upon a composite array of user inputs.

5. The method of claim 4 wherein said composite algorithm is configured independently of font size and typeface.

6. The method of claim 1 wherein said underlining functions include a homogeneous algorithm for drawing rules as a function of typeface and font size without user inputs and wherein one of said underline algorithms is a composite algorithm for drawing rules based upon a composite array of user inputs.

7. In an imaging system including a text processor having underlining functions, the method of imaging rules for text characters of one or more fonts wherein the text characters have a font size, F—size, and a typestyle defined by metric parameters, Para—1 and Para—2, comprising:
 reading user inputs for defining the characteristics of the rules for an underlining function,
 selecting an underline algorithm from a plurality of underline algorithms as a function of the user inputs wherein one of said underline algorithms is a composite algorithm for drawing rules based upon a composite array of user inputs, and wherein said composite algorithm combines said font size and parameters as a function of said user inputs,
 configuring the manner in which the selected algorithm depends on font properties as a function of the user inputs,
 drawing the rules in accordance with the selected underline algorithm.

8. The method of claim 7 wherein said composite array combines said user inputs to define an offset, O, of a first rule relative to said text characters, to define a thickness, T, of one or more rules including the first rule and a second rule and to define a gap, G, between the first rule and the second rule using a composite array having input values X,Y,Z;X',Y',Z'; X'',Y'', Z'' as follows:

$O = X(F\_size) + Y(F\_size, Para\_1) + Z$
$T = X'(F\_size) + Y'(F\_size, Para\_2) + Z'$
$G = X''(F\_size) + Y''(F\_size, Para\_2) + Z''$ 9. In an imaging system including a text processor having underlining functions, the method of imaging rules for text characters of one or more fonts wherein the text characters have a font size, F—size, and a typestyle defined by metric parameters, Para—1 and Para—2, comprising:
 reading user inputs for defining the characteristics of the rules for an underlining function,
 selecting an underline algorithm from a plurality of underline algorithms as a function of the user inputs wherein said underlining functions include a homogeneous algorithm for drawing rules as a function of typeface and font size without user inputs and wherein one of said underline algorithms is a composite algorithm for drawing rules based upon a composite array of user inputs, and wherein said composite algorithm combines said font size and parameters as a function of said user inputs,
 configuring the manner in which the selected underline algorithm depends on font properties as a function of the user inputs,
 drawing the rules in accordance with the selected underline algorithm.

10. The method of claim 9 wherein said composite array combines said user inputs to define an offset, O, of a first rule relative to said text characters, to define a thickness, T, of one or more rules including the first rule and a second rule and to define a gap, G, between the first rule and the second rule using a composite array having input values X,Y,Z; X',Y',Z'; X'', Y'', Z'' as follows:

$O = X(F\_size) + Y(F\_size, Para\_1) + Z$
$T = X'(F\_size) + Y'(F\_size, Para\_2) + Z'$
$G = X''(F\_size) + Y''(F\_size, Para\_2) + Z''$.

11. In an imaging system including a text processor for processing text characters and associated text functions where the text characters are arrayed along a baseline in runs having a font size, F—size, and a typestyle defined by metric parameters including a rule position, Underline—Position, and a rule thickness, Underline—Thickness, and wherein each run has the same font size, metric parameters, and text function characteristics, the method of imaging the text characters and the text functions comprising:
 processing runs of text characters and for each run,
 reading user inputs for defining the characteristics of the text functions, wherein said reading step includes reading nine multipliers X,Y,Z; X',Y', Z'; X'',Y'', Z'' which define an offset, O, of a first rule from the baseline, which define a thickness, T, of rules and which define a gap, G, between the first and second rule using a composite array as follows:

$O = X * F\_size + H * F\_size * Underline\_Position + Z$
$T = X'* F\_size + Y'* F\_size * Underline\_Thickness + Z'$
$G = X'''* F\_size + Y'''* F\_size * Underline\_Thickness + Z''$ selecting a function algorithm from a plurality of function algorithms in response to the user inputs,
 drawing the text functions based upon the selected function algorithm, and
 drawing the text characters.

12. The method of claim 11 wherein in said reading step said nine multipliers X, Y,Z; X', Y',Z'; X'',Y'',Z'' are user selected with 0,1 or other integer or fractional values.

13. In an imaging system including a text processor for processing text characters and associated text functions where the text characters are arrayed along a baseline in runs having a font size, F—size, and a typestyle defined by a first parameter, Para—1, and a second parameter, Para—2, and wherein each run has the same font size, metric parameters, and text function characteristics, the method of imaging the text characters and the text function comprising:
 processing runs of text characteristics of the text functions, wherein said reading step includes reading nine input values X,Y,Z; X',Y',Z'; X'',Y''', Z'' which define an offset, O, of a first image relative to the baseline, which define a thickness, T, of one or more images and which define a gap, G, of a first image relative to a second image using a composite array as follows:

$O = X(F\_size) + Y(F\_size, Para\_1) + Z$
$T = X'(F\_size) + Y'(F\_size, Para\_2) + Z'$
$G = X''(F\_size) + Y''(F\_size, Para\_2) + Z''$ selecting a function algorithm from a plurality of function algorithms in response to the user inputs,
 drawing the text functions based upon the selected function algorithm, and
 drawing the text characters.

14. The method of claim 13 wherein in said reading step said nine multipliers X, Y,Z; X',Y',Z'; X'',Y'',Z'' are used selected with 0, 1 or other integer or fractional values.

15. In an imaging system including a text processor having underlining functions, the method of imaging rules for text characters of one or more fonts, wherein the text characters have a font size, F—size, and a typestyle defined by metric parameters, Para—1 and Para—2, comprising:

reading user inputs for defining the characteristics of the rules for the underlining function, selecting an underline algorithm from a plurality of underline algorithms as a function of the user inputs, said underline algorithms including an algorithm having a double underline function and including a composite algorithm for drawing rules based upon a composite array of user inputs and wherein said composite algorithm combines said font size and parameters as a function of said user inputs, configuring the manner in which the selected algorithm depends on font properties as a function of the user inputs, drawing the rules in accordance with the underline algorithm.

16. The method of claim 15 wherein said composite array combines said user inputs to define an offset, O, of a first rule relative to said text characters, to define a thickness, T, of one or more rules including the first rule and a second rule and to define a gap, G, between the first rule and the second rule using a composite array having input values X,Y,Z; X',Y',Z'; X",Y",Z" as follows:

$O = X(F\_size) + Y(F\_size, Para\_1) + Z$
$T = X'(F\_size) + Y'(F\_size, Para\_2) + Z'$
$G = X"(F\_size) + Y"(F\_size, Para\_2) + Z"$.

17. In an imaging system including a text processor having underlining functions, the method of imaging rules for text characters of one or more fonts, wherein the text characters have a font size, F—size, and a typestyle defined by metric parameters, Para—1 and Para—2, comprising:

reading user inputs for defining the characteristics of the rules for the underlining function, selecting an underline algorithm from a plurality of underline algorithms as a function of the user inputs, said underline algorithms including an algorithm having a double underlining function and including a homogeneous algorithm for drawing rules as a function of typeface and font size without user inputs and wherein one of said underline algorithms is a composite algorithm for drawing rules based upon a composite array of user inputs, and wherein said composite algorithm combines said font size and parameters as a function of said user inputs, configuring the manner in which the selected algorithm depends on font properties as a function of the user inputs, drawing the rules in accordance with the underline algorithm.

18. The method of claim 17 wherein said composite array combines said user inputs to define an offset, O, of a first rule relative to said text characters, to define a thickness, T, of one or more rules including the first rule and a second rule and to define a gap, G, between the first rule and the second rule using a composite array having input values X,Y,Z; X',Y'Z'; X",Y",Z" as follows:

$O = X(F\_size) + Y(F\_size, Para\_1) + Z$
$T = X'(F\_size) + Y'(F\_size, Para\_2) + Z'$
$G = X"(F\_size) + Y"(F\_size, Para\_2) + Z"$.

19. In an imaging system including a text processor for processing text characters and associated text functions where the text characters are arrayed along a baseline in runs having a font size, F—size, and a typestyle defined by metric parameters including a rule position, Underline—Position, and a rule thickness, Underline—Thickness, and wherein each run has the same font size, metric parameters, and text function characteristics, the method of imaging the text characters and the text functions comprising:

processing runs of text characters and for each run,
reading user inputs for defining the characteristics of the text functions,
selecting a function algorithm from a plurality of function algorithms in response to the user inputs,
drawing the text functions based upon the selected function algorithm, said function algorithms including a double underlining function, and
drawing the text characters.

20. The method of claim 19 wherein said reading step includes reading nine multipliers X,Y,Z; X',Y',Z'; X",Y",Z" which define an offset, O, of a first rule from the baseline, which define a thickness, T, of rules and which define a gap, G, between the first and a second rule using a composite array as follows:

$O = X * F\_size + Y * F\_size * Underline\_Position + Z$
$T = X'* F\_size + Y'* F\_size * Underline\_Thickness + Z'$
$G = X"* F\_size + Y"* F\_size * Underline\_Thickness + Z"$.

21. The method of claim 20 wherein in said reading step said nine multipliers X,Y,Z; X',Y',Z'; X",Y",Z" are user selected with 0,1 or other integer or fractional values.

22. In an imaging system including a text processor for processing text characters and associated text functions where the text characters are arrayed along a baseline in runs having a font size, F—size, and a typestyle defined by a first parameter, Para—1, and a second parameter, Para—2, and wherein each run has the same font size, metric parameters, and text function characteristics, the method of imaging the text characters and the text functioning comprising:

processing runs of text characters and for each run,
reading user inputs for defining the characteristics of the text functions, wherein said reading step includes reading nine input values X,Y,Z; X',Y',Z'; X",Y", Z" which define an offset, O, of a first image relative to the baseline, which define a thickness, T, of one or more images and which define a gap, G, of the first image relative to a second image using a composite array as follows:

$O = X(F\_size) + Y(F\_size, Para\_1) + Z$
$T = X'(F\_size) + Y'(F\_size, Para\_2) + Z'$
$G = X"(F\_size) + Y"(F\_size, Para\_2) + Z"$ selecting a function algorithm from a plurality of function algorithms in response to the user inputs, said function algorithms including a double underlining function,
drawing the text functions based upon the selected functional algorithm and
drawing the text characters.

23. The method of claim 22 wherein in said reading step said nine multipliers X, Y,Z; X',Y',Z'; X",Y",Z" are user selected with 0,1 or other integer or fractional values.

* * * * *